United States Patent
Eilebrecht

(10) Patent No.: US 7,539,981 B2
(45) Date of Patent: May 26, 2009

(54) XML-BASED PREPROCESSOR

(75) Inventor: Eric L. Eilebrecht, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 615 days.

(21) Appl. No.: 10/768,256

(22) Filed: Jan. 30, 2004

(65) Prior Publication Data

US 2005/0172276 A1    Aug. 4, 2005

(51) Int. Cl.
G06F 9/45 (2006.01)
G06F 9/44 (2006.01)

(52) U.S. Cl. .................... 717/137; 717/106; 717/143
(58) Field of Classification Search .................... None
See application file for complete search history.

(56) References Cited

U.S. PATENT DOCUMENTS

| | | | |
|---|---|---|---|
| 6,594,823 B1 * | 7/2003 | Corbin et al. | 717/143 |
| 7,152,229 B2 * | 12/2006 | Chong et al. | 717/146 |
| 7,222,333 B1 * | 5/2007 | Mor et al. | 717/115 |
| 7,346,897 B2 * | 3/2008 | Vargas | 717/137 |
| 2004/0015832 A1 * | 1/2004 | Stapp et al. | 717/106 |
| 2004/0015898 A1 * | 1/2004 | Tewksbary | 717/140 |
| 2004/0230958 A1 * | 11/2004 | Alaluf | 717/140 |
| 2005/0138606 A1 * | 6/2005 | Basu et al. | 717/136 |

FOREIGN PATENT DOCUMENTS

JP        2002182915 A    *    6/2002

OTHER PUBLICATIONS

"Prospects of encoding Java source code in XML", Simic et al., Jun. 2003, pp. 1-6. Online retrieved at <citeseer.ist.psu.edu/simic03prospects.html>.*
"Localizing XML documents (at source level) using XSLT", Y. Yu, Dec. 2003, pp. 1-9. Online retrieved at <www.cs.toronto.edu/~yijun/slides/ai2003.ppt>.*

* cited by examiner

*Primary Examiner*—Tuan Q Dam
*Assistant Examiner*—Thuy Dao
(74) *Attorney, Agent, or Firm*—Lee & Hayes, PLLC

(57) ABSTRACT

In an implementation of an XML-based preprocessor, a programmed source file is parsed to generate a syntactic representation of the programmed source file. An XML (Extensible Markup Language) document is generated from the syntactic representation of the programmed source file, and a transform is applied to the XML document to generate a modified XML document from which an output file is generated in a format of the programmed source file.

10 Claims, 5 Drawing Sheets

US 7,539,981 B2

XML-BASED PREPROCESSOR

TECHNICAL FIELD

This invention relates to an XML-based preprocessor.

BACKGROUND

An object-orientated programming language C# (pronounced "C-Sharp") is implemented as an alternative to other high-level programming languages, such as C++ and Visual Basic. A full description of C# is detailed in the C# Language Specification, Standard ECMA-334 ($2^{nd}$ ed., December 2002), ECMA International.

A compiler is an application component of a programming language that processes source statements in source code written in the programming language by a programmer, and generates a machine code output that is executed by a computer processor. Generally, a compiler analyzes and/or parses the source statements syntactically in successive stages to build the output code.

A preprocessor may be implemented as an application component of a programming language and is an intermediate process before compiling the source code with a compiler. With a preprocessor, programming tasks can be automated that otherwise can not be implemented, or are difficult to implement, with the standard features of a programming language. Many high-level programming languages, such as C++, have both a preprocessor for intermediate source code translation and a compiler to translate the source code into executable machine code. However, in C#, there is no separate pre-processing step (Standard ECMA-334, page 62, ¶9.5). This limitation of the C# programming language makes it difficult to automate programming tasks and implement some programming features, such as functions defined by textual substitution (commonly known as "macros").

SUMMARY

An XML-based preprocessor is described herein.

In an implementation, a programmed source file is parsed to generate a syntactic representation of the programmed source file. An XML (Extensible Markup Language) document is generated from the syntactic representation of the programmed source file, and one or more transforms are applied to the XML document to generate a modified XML document from which an output file is generated in a format of the programmed source file.

In another implementation, a C# (C-Sharp) source file is parsed to generate a syntactic representation of the C# source file. An XML (Extensible Markup Language) document is generated from the syntactic representation of the C# source file, and one or more transforms are applied to the XML document to generate a modified XML document from which a C# output file is generated.

BRIEF DESCRIPTION OF THE DRAWINGS

The same numbers are used throughout the drawings to reference like features and components.

DETAILED DESCRIPTION

An XML-based preprocessor is described that enables programming features in a programming language, such as C# (C-Sharp), that would otherwise be difficult to implement, and enables automation of many common programming tasks. The XML-based preprocessor allows a programmer to apply arbitrary transforms to a programmed source file prior to the source file being compiled. A transform can be designated in the programmed source file, and in a C# source file, a transform can be designated as a module-level attribute which is a standard feature of the C# programming language.

In an embodiment, a module-level attribute in a C# source file designates an Extensible Stylesheet Language (XSL) transform to be applied to the C# source file in which the attribute appears. The C# source file is input to an XML-based C# preprocessor which parses the source file to generate an in-memory graph of the syntactic structure of the file (e.g., a syntactic representation of the C# source file). An Extensible Markup Language (XML) document is generated from the syntactic representation of the C# source file, and the XML document is searched for the module-level attribute(s) that designate an XSL transform to be applied to the XML document. A first XSL transform is applied to generate a modified XML document and, if subsequent XSL transforms are designated, the next transform is applied to the modified XML document, and so on. A C# output file is generated from the resultant XML document which may then be compiled using a standard C# compiler.

The following discussion is directed to systems and methods for an XML-based preprocessor that enhances the capabilities of the C# programming language, and may be implemented to enhance the capabilities of any number of other programming languages. While features of the described systems and methods can be implemented in any number of different computing environments and application programs, they are described in the context of the following exemplary implementations. Further, although the preprocessor is described herein as an XML-based preprocessor, a preprocessor for a programming language can be implemented with any number of different markup languages such as HTML, XML, or any other type of tag-based language.

Figure 1:
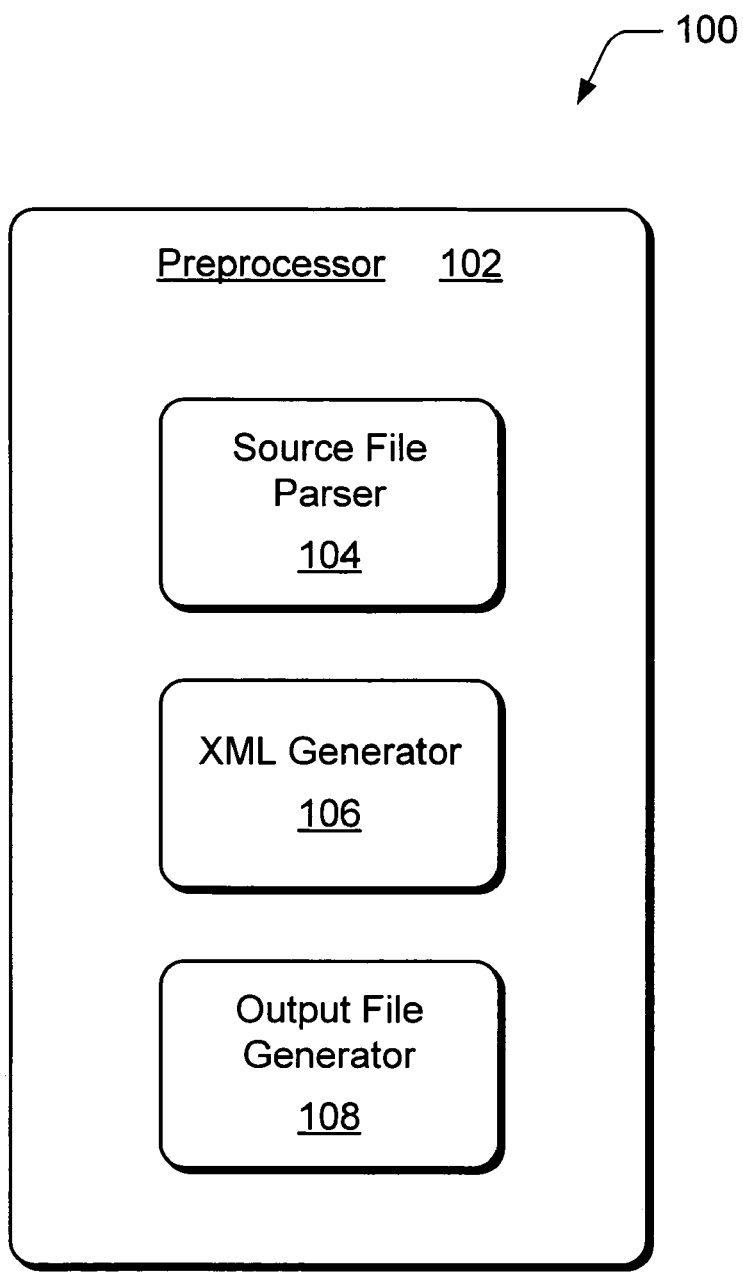
FIG. 1 illustrates an exemplary embodiment of an XML-based preprocessor system.

FIG. 1 illustrates an exemplary embodiment of an XML-based preprocessor system 100 which includes a preprocessor 102. In this example, the preprocessor 102 is implemented with a source file parser 104, an XML generator 106, and a output file generator 108. The source file parser 104 parses a programmed source file and generates an in-memory graph of the syntactic structure of the source file which is a syntactic representation of the programmed source file. In an embodiment, the XML-based preprocessor system 100 can be implemented with a C# preprocessor that includes a C# source file parser, an XML generator, and a C# output file generator.

The XML generator 106 generates an XML document from the syntactic representation of the programmed source file. The Extensible Markup Language (XML) provides a flexible way to consistently create a common information format of a programmed source file. The XML generator 106 searches the XML document for transforms designated in the programmed source file. In an embodiment, a transform is designated in a C# source file as a module-level attribute which is a standard feature of the C# programming language. A module-level attribute is user-definable in C# and can be defined such that a C# preprocessor 102 (e.g., the XML generator 106 in this example) recognizes the user-definable attribute, yet the attribute has no meaning to a standard C# compiler. The C# source file can then be compiled without preprocessing the source file and the user-definable attribute will not cause any adverse or unexpected compilation results when compiling the source file.

The XML generator 106 applies the transform(s) designated in the programmed source file to the XML document to generate a modified XML document. A transform can be implemented as a programmed transform, an Extensible Stylesheet Language (XSL) transform, or as any number of other different types of XML document transforms. An XSL transformation is a standard way to describe how to transform, change, or modify the structure of an XML document into a modified XML document. In one example, an XSL transform modifies the source tree or data structure of an XML document into the result tree for a modified XML document which can be different in structure than the XML document to which the transform is applied. The coding for an XSL transform is also referred to as a stylesheet and can be combined with an XSL stylesheet or can be implemented independently.

The output file generator 108 generates an output file from the modified XML document generated by the XML generator 106. The output file is a modified version of the programmed source file according to the one or more transforms applied to the XML document during preprocessing. In an embodiment, the output file generator 108 can also be implemented as an XSL transform to be applied to the XML document, the result of which is the output file which can then be compiled using a standard compiler of the programming language used to generate the programmed source file.

Although the source file parser 104, XML generator 106, and output file generator 108 of the preprocessor 102 are each illustrated and described as single and separate preprocessor modules or application programs, each of the preprocessor application programs can be implemented as several component applications distributed to each perform one or more functions of an XML-based preprocessor. Further, although the source file parser 104, XML generator 106, and output file generator 108 of the preprocessor 102 are illustrated and described as separate application programs, the preprocessor application programs can be implemented together as a single application program, such as a single preprocessor application.

Figure 2:
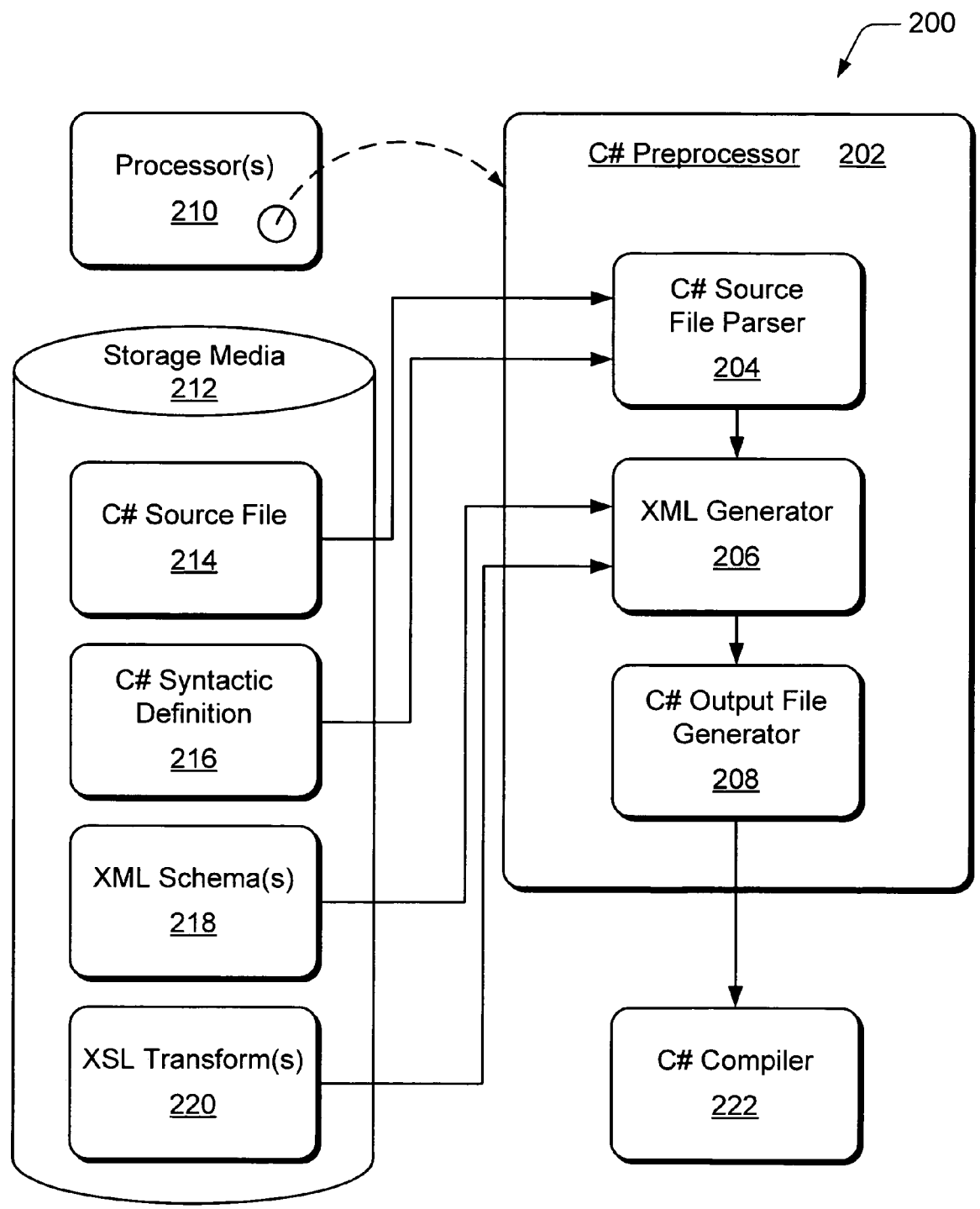
FIG. 2 illustrates various components of a computing system in which an exemplary embodiment of an XML-based preprocessor system can be implemented.

FIG. 2 illustrates various components of a computing system 200 in which an exemplary embodiment of the XML-based preprocessor system 100 shown in FIG. 1 can be implemented. In this example, an XML-based C# preprocessor 202 is implemented with a C# source file parser 204, an XML generator 206, and a C# output file generator 208. The computer system 200 includes one or more processors 210 (e.g., any of microprocessors, controllers, and the like) which execute the C# preprocessor 202 and process instructions to control the operation of the various application modules and components of the XML-based C# preprocessor system. The computing system 200 can be implemented with one or more memory components, such as any form of storage media 212. Although not shown in this example, the computer system 200 may be implemented with any number and combination of differing components as further described below with reference to the exemplary computing systems, devices, and components shown in FIG. 5.

The storage media 212 maintains a C# source file 214, a C# syntactic definition 216, an XML schema 218, and one or more XSL transforms 220. The C# source file parser 204 of the C# preprocessor 202 receives the C# source file 214 and the C# syntactic definition 216 as inputs, and generates a syntactic representation of the C# source file according to the syntactic definition 216. The syntactic representation of the C# source file can also be maintained with storage media 212 as an in-memory representation of the source file.

The XML generator 206 generates an XML document from the syntactic representation of the C# source file and utilizes the XML schema 218 maintained with storage media 212 to validate the XML document. The C# source file is parsed into components of the data which can be validated as accurate and conforming to a particular XML specification, such as the XML schema definition 218. As described above with reference to FIG. 1, the XML generator 206 also searches the XML document for transform designators stated in the C# source file which are user-definable module-level attributes, and which can be designated as an XSL transform.

The XML generator 206 applies the XSL transform(s) 220 designated in the C# source file to the XML document to generate a modified XML document. A first XSL transform 220 is applied to generate a modified XML document and, if subsequent XSL transforms are designated, the next XSL transform 220 is applied to the modified XML document, and so on consecutively. The C# output file generator 208 generates a C# output file (e.g., an output of the C# preprocessor 202) for input to a standard C# compiler 222. The C# output file is a modified C# source file (e.g., a modified version of the C# source file 214) according to the one or more XSL transforms 220 applied to the XML document during preprocessing. In an embodiment, the C# output file generator 208 can also be implemented as an XSL transform 220 to be applied to the XML document.

Methods for an XML-based preprocessor described with reference to FIG. 3 and an XML-based C# preprocessor described with reference to FIG. 4 may be described in the general context of computer executable instructions. Generally, computer executable instructions include routines, programs, objects, components, data structures, procedures, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 3:
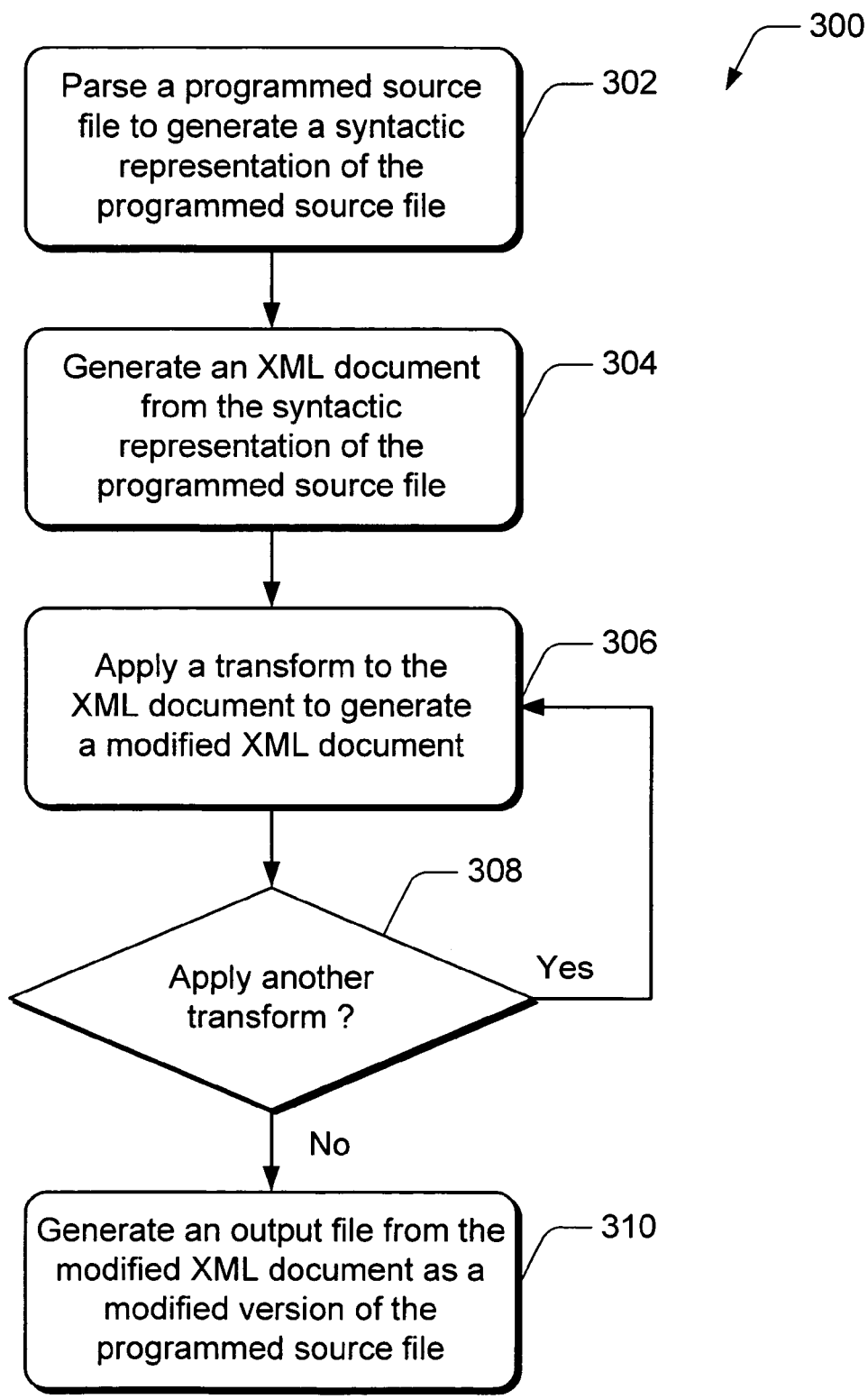
FIG. 3 is a flow diagram that illustrates an exemplary method for an embodiment of an XML-based preprocessor.

FIG. 3 illustrates an exemplary method 300 for XML-based preprocessing. The order in which the method is described is not intended to be construed as a limitation, and any number of the described method blocks can be combined in any order to implement the method. Furthermore, the method can be implemented in any suitable hardware, software, firmware, or combination thereof.

At block 302, a programmed source file is parsed to generate a syntactic representation of the source file. For example, source file parser 104 (FIG. 1) generates a syntactic representation of a source file. At block 304, an XML document is generated from the syntactic representation of the programmed source file. For example, XML generator 106 generates an XML document from the syntactic representation of the programmed source file generated by the source file parser 104.

At block 306, a transform is applied to the XML document to generate a modified XML document. For example, XML generator 106 applies a transform, which may be designated in the programmed source file, to the XML document to generate a modified XML document. Any number of different types of transforms, such as a programmed transform or an XSL transform, can be applied to the XML document to generate the modified XML document.

At block 308, a determination is made as to whether another transform is to be applied to the modified XML document. If another transform is to be applied to the modified XML document (i.e., "yes" from block 308), then the method continues at block 306 and the next transform is applied to the modified XML document (e.g., to generate another or revised modified XML document, and so on). If another transform is not applied to the modified XML document (i.e., "no" from block 308), then an output file is generated from the modified XML document at block 310. For example, the output file generator 108 generates the output file from a modified XML document. The output file is a modified version of the programmed source file according to the one or more transforms applied to the XML document during preprocessing.

Figure 4:
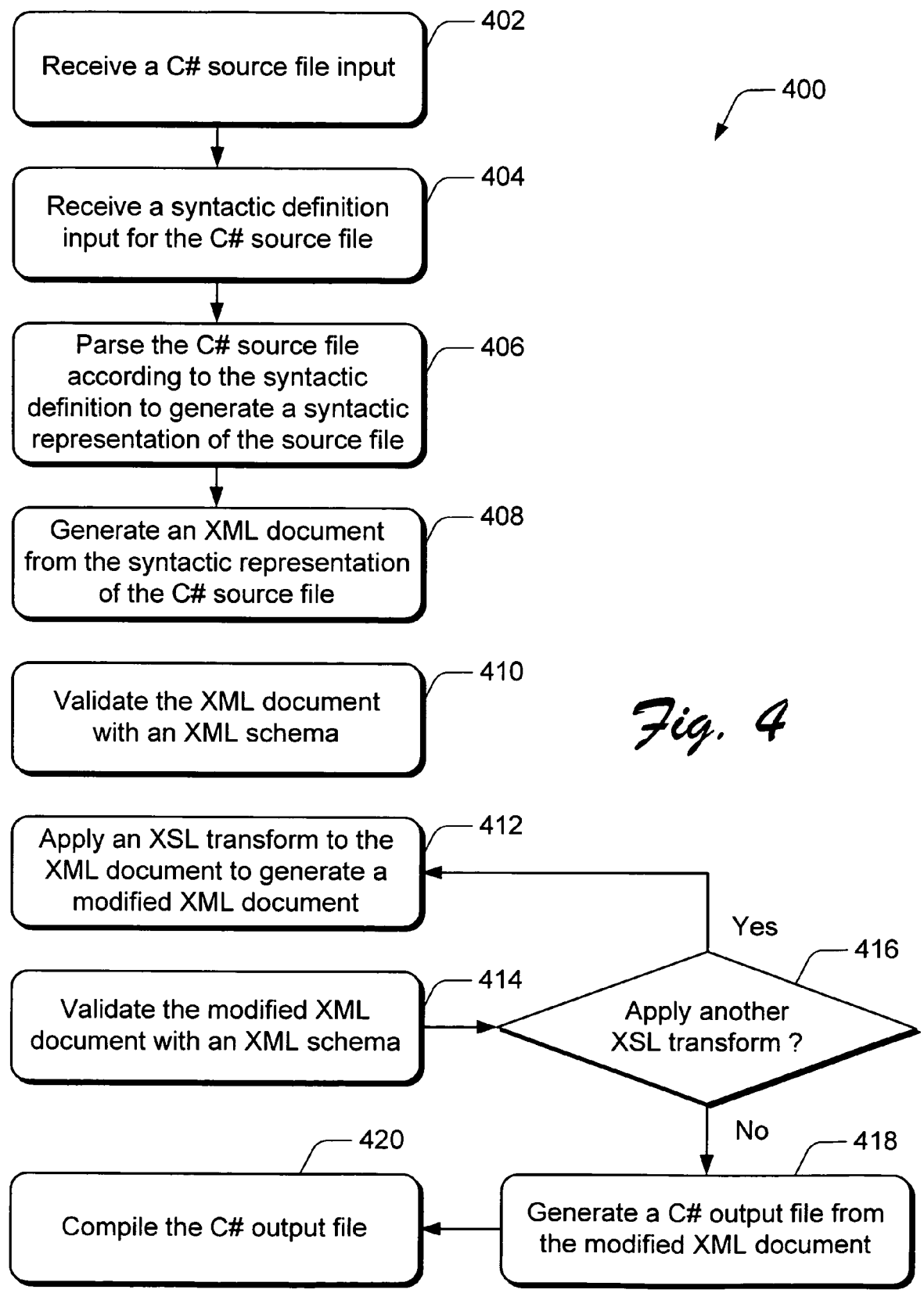
FIG. 4 is a flow diagram that illustrates an exemplary method for an embodiment of an XML-based C# preprocessor.

FIG. 4 illustrates an exemplary method 400 for XML-based C# preprocessing. The order in which the method is described is not intended to be construed as a limitation, and any number of the described method blocks can be combined in any order to implement the method. Furthermore, the method can be implemented in any suitable hardware, software, firmware, or combination thereof.

At block 402, a C# source file is received as an input to an XML-based C# preprocessor. At block 404, a syntactic definition for the C# source file is received as an input to the preprocessor. At block 406, the C# source file is parsed according to the syntactic definition to generate a syntactic representation of the source file. For example, C# source file parser 204 (FIG. 2) receives C# source file 214 and C# syntactic definition 216 as inputs and generates the syntactic representation of the source file according to the C# syntactic definition 216.

At block 408, an XML document is generated from the syntactic representation of the C# source file, and at block 410, the XML document is validated with an XML schema. For example, XML generator 206 generates an XML document from the syntactic representation of the C# source file and utilizes XML schema 218 to validate the XML document. At block 412, an XSL transform is applied to the XML document to generate a modified XML document. For example, XML generator 206 applies an XSL transform 220 to the XML document and generates a modified XML document. At block 414, the modified XML document (e.g., the output of the transform) is validated with an XML schema.

At block 416, a determination is made as to whether another XSL transform is to be applied to the modified XML document. If another XSL transform is to be applied to the modified XML document (i.e., "yes" from block 416), then the method continues at block 412 and the next transform is applied to the modified XML document (e.g., to generate another or revised modified XML document, and so on). If another transform is not applied to the XML document (i.e., "no" from block 416), then a C# output file is generated from the modified XML document at block 418. For example, the C# output file generator 208 generates the C# output file from the modified XML document. At block 420, the C# output file is compiled.

Figure 5:
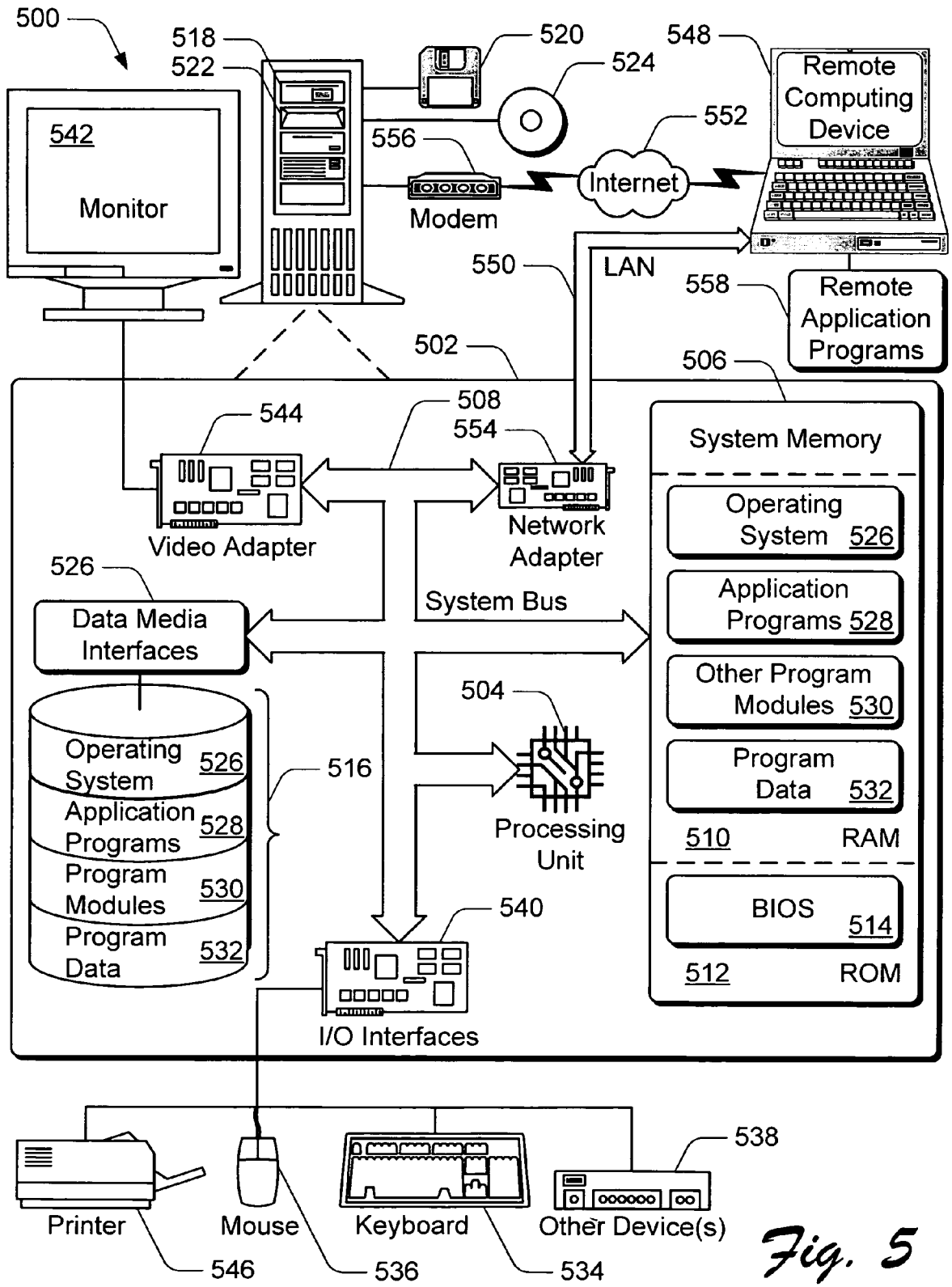
FIG. 5 illustrates exemplary computing systems, devices, and components in an environment that an XML-based preprocessor and an XML-based C# preprocessor can be implemented.

FIG. 5 illustrates an exemplary computing environment 500 within which the XML-based preprocessor systems and methods, as well as the computer, network, and system architectures described herein, can be either fully or partially implemented. Exemplary computing environment 500 is only one example of a computing system and is not intended to suggest any limitation as to the scope of use or functionality of the network architectures. Neither should the computing environment 500 be interpreted as having any dependency or requirement relating to any one or combination of components illustrated in the exemplary computing environment 500.

The computer and network architectures in computing environment 500 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The computing environment 500 includes a general-purpose computing system in the form of a computing device 502. The components of computing device 502 can include, by are not limited to, one or more processors 504 (e.g., any of microprocessors, controllers, and the like), a system memory 506, and a system bus 508 that couples various system components including the processor 504 to the system memory 506. The one or more processors 504 process various computer-executable instructions to control the operation of computing device 502 and to communicate with other electronic and computing devices.

The system bus 508 represents any number of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus, and the like.

Computing environment 500 typically includes a variety of computer-readable media. Such media can be any available media that is accessible by computing device 502 and includes both volatile and non-volatile media, removable and non-removable media. The system memory 506 includes computer-readable media in the form of volatile memory, such as random access memory (RAM) 510, and/or non-volatile memory, such as read only memory (ROM) 512. A basic input/output system (BIOS) 514, containing the basic routines that help to transfer information between elements within computing device 502, such as during start-up, is stored in ROM 512. RAM 510 typically contains data and/or program modules that are immediately accessible to and/or presently operated on by one or more of the processors 504.

Computing device 502 can also include other removable/non-removable, volatile/non-volatile computer storage media. By way of example, a hard disk drive 516 is included for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, nonvolatile optical disk 524 such as a CD-ROM, DVD, or any other type of optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 can be connected to the system bus 508 by a SCSI interface (not shown).

The disk drives and their associated computer-readable media provide non-volatile storage of computer-readable instructions, data structures, program modules, and other data for computing device 502. Although the example illustrates a hard disk 516, a removable magnetic disk 520, and a removable optical disk 524, other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment 500.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, application programs 528, other program modules 530, and program data 532 (or some combination thereof) may include an embodiment of the systems and methods described herein.

Computing device 502 can include a variety of computer-readable media identified as communication media. Communication media typically embodies computer-readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

A user can enter commands and information into computing device 502 via input devices such as a keyboard 534 and a pointing device 536 (e.g., a "mouse"). Other input devices 538 (not shown specifically) may include a microphone, joystick, game pad, controller, satellite dish, serial port, scanner, and/or the like. These and other input devices are connected to the one or more processors 504 via input/output interfaces 540 that are coupled to the system bus 508, but may be connected by other interface and bus structures, such as a parallel port, game port, and/or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computing device 502 via the input/output interfaces 540.

Computing device 502 can operate in a networked environment using logical connections to one or more remote computers, such as a remote computing device 548. By way of example, the remote computing device 548 can be a personal computer, portable computer, a server, a router, a network computer, a peer device or other common network node, and the like. The remote computing device 548 is illustrated as a portable computer that can include many or all of the elements and features described herein relative to computing device 502.

Logical connections between computing device 502 and the remote computer 548 are depicted as a local area network (LAN) 550 and a general wide area network (WAN) 552. Such networking environments are commonplace in offices, enterprise-wide computer networks, intranets, and the Internet. When implemented in a LAN networking environment, the computing device 502 is connected to a local network 550 via a network interface or adapter 554. When implemented in a WAN networking environment, the computing device 502 typically includes a modem 556 or other means for establishing communications over the wide network 552. The modem 556, which can be internal or external to computing device 502, can be connected to the system bus 508 via the input/output interfaces 540 or other appropriate mechanisms. The illustrated network connections are exemplary and other means of establishing communication link(s) between the computing devices 502 and 548 can be utilized.

In a networked environment, such as that illustrated with computing environment 500, program modules depicted relative to the computing device 502, or portions thereof, may be stored in a remote memory storage device. By way of example, remote application programs 558 reside on a memory device of remote computing device 548. For purposes of illustration, application programs and other executable program components, such as the operating system, are illustrated herein as discrete blocks, although it is recognized that such programs and components reside at various times in different storage components of the computer system 502, and are executed by the one or more processors 504 of the computing device.

Although embodiments of an XML-based preprocessor have been described in language specific to structural features and/or methods, it is to be understood that the subject of the appended claims is not necessarily limited to the specific features or methods described. Rather, the specific features and methods are disclosed as exemplary implementations of an XML-based preprocessor.

The invention claimed is:

1. A method, comprising:
   parsing a programmed source file to generate an in-memory graph of a syntactical structure of the source file, wherein the in-memory graph is a syntactic representation of the programmed source file;
   generating an XML (Extensible Markup Language) document from the syntactic representation of the programmed source file;
   validating the XML document with an XML schema;
   searching for a first Extensible Stylesheet Language (XSL) transform, wherein the first XSL transform is designated in the programmed source file as a first module-level attribute, the first module-level attribute being user-defined such that the XML-based preprocessor recognizes the first module-level attribute and a source file compiler does not;
   applying the first XSL transform to the XML document to generate a modified XML document;
   validating the modified XML document with the XML schema;
   searching for a second XSL transform, wherein the second XSL transform is designated in the programmed source file as a second module-level attribute, the second module-level attribute being user-defined such that the XML-based preprocessor recognizes the attribute and the source file compiler does not; and generating an output file from the modified XML document in a format of the programmed source file.

2. A method as recited in claim 1, further comprising:

receiving the programmed source file as a first preprocessor input;

receiving a syntactic definition of the programmed source file as a second preprocessor input; and wherein parsing the programmed source file includes parsing the programmed source file according to the syntactic definition of the programmed source file.

3. A method as recited in claim 1, wherein the programmed source file is a C# (C-Sharp) source file.

4. One or more computer-readable media storage comprising computer-executable instructions that, when executed, direct a computing device to perform the method of claim 1.

5. An XML-based preprocessor, stored in one or more computer-readable storage media, comprising:

a source file parser configured to parse a programmed source file and generate an in-memory graph of a syntactic structure of the programmed source file, wherein the in-memory graph is a syntactic representation of the programmed source file;

an XML (Extensible Markup Language) generator configured to generate an XML document from the syntactic representation of the programmed source file, the XML generator further configured to:

validate the XML document with an XML schema;

search for a first Extensible Stylesheet Language (XSL) transform, wherein the first XSL transform is designated in the programmed source file as a first module-level attribute, the first module-level attribute being user-defined such that the XML-based preprocessor recognizes the first module-level attribute and a source file compiler does not;

apply the first XSL transform to the XML document to generate a modified XML document;

validate the modified XML document with the XML schema;

search for a second XSL transform, wherein the second XSL transform is designated in the programmed source file as a second module-level attribute, the second module-level attribute being user-defined such that the XML-based preprocessor recognizes the attribute and the source file compiler does not; and an output file generator configured to generate an output file from the modified XML document in a format of the programmed source file.

6. An XML-based preprocessor as recited in claim 5, wherein:

the programmed source file is a C# (C-Sharp) source file; and the output file generator is further configured to generate a C# output file from the modified XML document.

7. An XML-based preprocessor as recited in claim 5, wherein the source file parser is further configured to parse the programmed source file according to a syntactic definition of the programmed source file.

8. One or more computer-readable storage media comprising computer executable instructions that, when executed, direct a computing device to:

parse a programmed source file and generate an in-memory graph of a syntactic structure of the source file, wherein the in-memory graph is a syntactic representation of the programmed source file;

generate r an XML (Extensible Markup Language) document from the syntactic representation of the program source file, validate the XML document with an XML schema;

search for a first Extensible Stylesheet Language (XSL) transform, wherein the first XSL transform is designated in the programmed source file as a first module-level attribute, the first module-level attribute being user-defined such that the XML-based preprocessor recognizes the first module-level attribute and a source file compiler does not;

apply the first XSL transform to the XML document to generate a modified XML document;

validate the modified XML document with the XML schema;

search for a second XSL transform, wherein the second XSL transform is designated in the programmed source file as a second module-level attribute, the second module-level attribute being user-defined such that the XML-based preprocessor recognizes the attribute and the source file compiler does not; and generate an output file from the modified XML document in a format of the programmed source file.

9. One or more computer-readable storage media as recited in claim 8, further comprising computer executable instructions that, when executed, direct the computing device to parse the programmed source file according to a syntactic definition of the programmed source file.

10. One or more computer-readable storage media as recited in claim 8, further comprising computer executable instructions that, when executed, direct the computing device to compile the output file.

* * * * *